(12) United States Patent
Gerrese et al.

(10) Patent No.: US 11,908,303 B2
(45) Date of Patent: Feb. 20, 2024

(54) FORGOTTEN MOBILE DEVICE DETECTION AND MANAGEMENT

(71) Applicant: GM Cruise Holdings LLC, San Francisco, CA (US)

(72) Inventors: Alexander Willem Gerrese, San Francisco, CA (US); Jeremy Stephen Juel, Seattle, WA (US); Aakanksha Mirdha, San Francisco, CA (US); Yifei Zhang, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/945,611

(22) Filed: Sep. 15, 2022

(65) Prior Publication Data

US 2023/0020699 A1 Jan. 19, 2023

Related U.S. Application Data

(63) Continuation of application No. 17/189,620, filed on Mar. 2, 2021, now Pat. No. 11,475,755.

(51) Int. Cl.
| | |
|---|---|
| *G08B 21/24* | (2006.01) |
| *H04W 4/40* | (2018.01) |
| *B60R 25/24* | (2013.01) |
| *H04W 4/38* | (2018.01) |
| *H04W 4/80* | (2018.01) |
| *G06V 20/59* | (2022.01) |
| *B60R 25/25* | (2013.01) |
| *B60R 25/30* | (2013.01) |

(52) U.S. Cl.
CPC .............. *G08B 21/24* (2013.01); *B60R 25/24* (2013.01); *B60R 25/241* (2013.01); *H04W 4/40* (2018.02); *B60R 25/25* (2013.01); *B60R 25/305* (2013.01); *G06V 20/59* (2022.01); *H04W 4/38* (2018.02); *H04W 4/80* (2018.02)

(58) Field of Classification Search
CPC ...... G05D 1/00; G05D 1/0055; G05D 1/0088; G05D 1/02; G05D 1/0221; G05D 1/0246; G01C 21/34; G01C 21/3438; G06K 13/00; B60W 30/18; B60R 25/00; B60R 25/24; B60R 25/241; B60R 11/02; B60R 11/0235; B60R 11/0264; B60R 11/04; G08B 21/00; G08B 21/24
See application file for complete search history.

(56) References Cited

U.S. PATENT DOCUMENTS

| | | | |
|---|---|---|---|
| 2020/0202149 A1* | 6/2020 | Zhang | G08B 6/00 |
| 2020/0301414 A1* | 9/2020 | Schwie | G01K 13/00 |
| 2021/0004002 A1* | 1/2021 | Wengreen | G05D 1/0088 |

OTHER PUBLICATIONS

NPL Search.*

* cited by examiner

*Primary Examiner* — Van T Trieu
(74) *Attorney, Agent, or Firm* — Akona IP PC

(57) ABSTRACT

Systems and methods for detecting when a mobile device is left in a vehicle, and returning forgotten devices to owners. Additionally, systems and methods are provided for preventing mobile devices from being left in vehicles. In particular, sensors inside a vehicle as well as sensors on mobile devices can be used to identify when a mobile device remains in a vehicle after the owner has exited the vehicle and ended their trip. Systems and methods are provided for notifying the user of the forgotten device and intelligently returning the device to the user.

20 Claims, 8 Drawing Sheets

FORGOTTEN MOBILE DEVICE DETECTION AND MANAGEMENT

CROSS-REFERENCE TO RELATED APPLICATION(S)

This application claims the benefit of and hereby incorporates by reference, for all purposes, the entirety of the contents of U.S. Nonprovisional application Ser. No. 17/189,620, filed Mar. 2, 2021, and entitled, "FORGOTTEN MOBILE DEVICE DETECTION AND MANAGEMENT."

FIELD OF THE DISCLOSURE

The present disclosure relates generally to autonomous vehicles (AVs) and to systems and methods for detecting devices in vehicles.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Passengers who ride in autonomous vehicles generally have belongings with them, and occasionally a passenger may inadvertently leave an item behind in a vehicle. When the item left behind is the passenger's mobile device, through which the passenger communicates with the vehicle service, it can be difficult to contact the passenger to return the device.

SUMMARY

Systems and methods are provided for detecting when a mobile device is left in a vehicle, and returning forgotten devices to the owners. Additionally, systems and methods are provided for preventing mobile devices from being left in vehicles. In particular, sensors inside a vehicle as well as sensors on mobile devices can be used to identify when a mobile device remains in a vehicle after the owner has exited the vehicle and ended their trip. Systems and method are provided for notifying the user of the forgotten device and intelligently returning the device to the user.

According to one aspect, a method is provided for detecting a device left in a vehicle, comprising establishing a connection with the device in the vehicle, at a passenger drop-off location, performing a prevention routine, after passenger drop-off, determining whether the connection with the device is maintained, and based on the determination, initiating a passenger notification protocol.

According to another aspect, a system is provided for detecting a device in a vehicle, comprising a sensor suite on the vehicle configured to determine when a passenger enters and exits the vehicle, a plurality of sensors inside the vehicle, wherein at least one of the sensors is configured to detect the device and establish a connection with the device, and an onboard computer configured to determine whether the connection with the device is maintained after the passenger exits the vehicle, and, based on the determination, configured to initiate a passenger notification protocol.

According to another aspect, a system is provided for detecting a device in a vehicle, comprising a plurality of sensors inside the vehicle, wherein at least one of the plurality of sensors is configured to detect the device and establish a connection with the device, an onboard computer in the vehicle configured to determine whether the connection with the device is maintained after passenger drop-off, and a central computing system configured to communicate with the device via a rideshare application and with the onboard computer, wherein the central computing system is configured to transmit data to the device and receive device location data.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for detecting when a mobile device is left in a vehicle, and returning forgotten devices to the owners. Additionally, systems and methods are provided for preventing mobile devices from being left in vehicles. In particular, sensors inside a vehicle as well as sensors on mobile devices can be used to identify when a mobile device remains in a vehicle after the owner has exited the vehicle and ended their trip. Systems and method are provided for notifying the user of the forgotten device and intelligently returning the device to the user.

As mobile technology improves at an exponential rate, more and more of people's daily life activities are performed through mobile devices. Thus, without a mobile device, a person may be unable to perform certain important activities such as paying for items or services, unlocking house doors, contacting friends, family, colleagues, or emergency services, and arranging for transportation to or from a destination. Additionally, devices can be quite expensive and many people make substantial investments in their mobile devices. When a passenger accidentally forgets a mobile device in a vehicle, the passenger risks losing both the investment in the device itself as well as data on the device and the ability to proceed with daily activities as planned.

While current rideshare services offer ways to recover lost items, item recovery incurs additional costs for the inconvenience of the driver having to return the items. Additionally, current rideshare item recovery services rely on the discretion of the driver to admit that the items were indeed found inside the car, and the incentive is low to return devices that cost hundreds of dollars (and often more than a thousand dollars). Systems and methods are provided herein to solve the problem of a passenger mindlessly forgetting a mobile device inside of an autonomous vehicle, as well as systems and methods for returning a forgotten device to the device owner.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Mobile Device Detection

Figure 1:
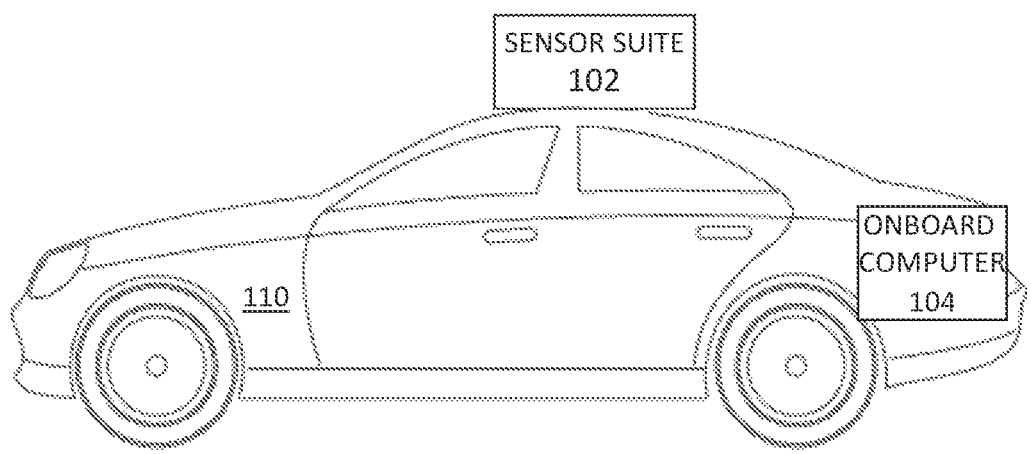
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for mobile device detection and management.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, data from the sensor suite 102 can be used to detect a passenger exiting a vehicle and/or to determine that a passenger has exited a vehicle. In some examples, the sensor suite 102 can be used to track initial movements of the passenger after the passenger exits the vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. In some examples, the interior sensors can be used to detect mobile devices inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Mobile Device Detection

Figure 2:
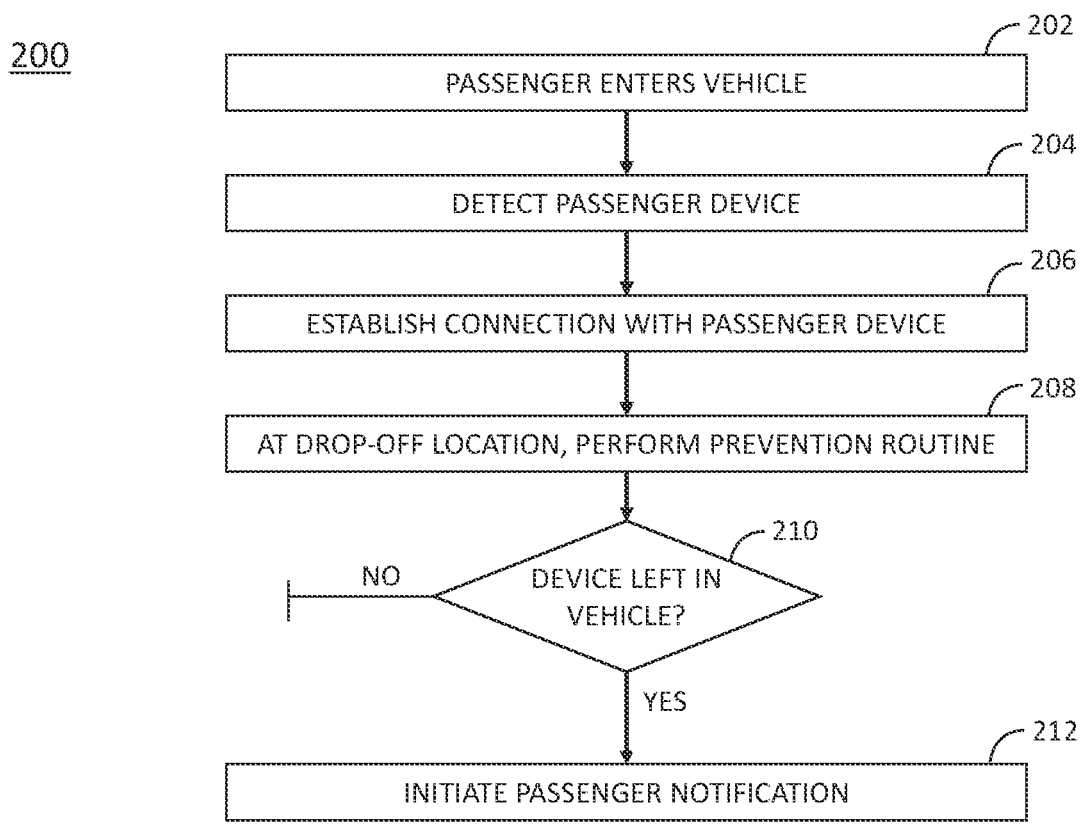
FIG. 2 is a diagram illustrating a method for mobile device detection, according to some embodiments of the disclosure.

FIG. 2 is a diagram illustrating a method 200 for mobile device detection, according to various embodiments of the disclosure. In various implementations, a passenger's mobile device is identified and tracked before the passenger enters the vehicle. For example, when a passenger is using a rideshare application, the passenger's mobile device identification information and GPS location are shared with the rideshare application. Additionally, when an autonomous vehicle arrives at a pick-up location, the vehicle may connect with and track the passenger's mobile device before the passenger enters the vehicle. The method 200 begins when a passenger enters a vehicle at step 202. At step 204, the passenger's device is detected. In some examples, the passenger's device is detected when the passenger is close to the vehicle, and before the passenger enters the vehicle at step 202. At step 206, a connection between the device and the vehicle is established. In various examples, the connection allows the vehicle to track the device.

Mobile devices generally include multiple sensors configured for identifying and tracking the devices. The sensors integrated into mobile devices can be used in conjunction with sensors in a vehicle. In general, a vehicle also includes many sensors, both interior and exterior to the vehicle. Some vehicle sensors can be used to track passenger mobile devices. There are many different ways a device can be detected at step 204. Similarly, there are many different ways a connection with the device can be established at step 206.

In one example, a high frequency sound is used to identify and connect with a mobile device. In particular, the rideshare mobile application used to request the ride can cause a selected high frequency sound to be played on the mobile device. The high frequency sound is higher than is perceptible to humans. A specific frequency can be assigned to a specific mobile device such that the particular frequency emitted from the device can be used to identify the device. The vehicle's microphones can detect the high frequency sound, and verify the frequency matches a specific frequency sent to the device. The device continues to emit the frequency until after the ride has ended. In some examples, the rideshare application causes the device to emit the frequency for a selected period of time after the ride has ended. If the vehicle sensors continue to detect the high frequency sound after the passenger exits the vehicle, then it can be determined that the device was left inside the vehicle. In various examples, within seconds of a device leaving the vehicle, the high frequency sound emitted by the device is not perceptible by car microphones. Thus, this method can identify a forgotten device within seconds of a passenger exiting the vehicle.

In a second example, the rideshare application tracks a mobile device's GPS location. The rideshare application accesses the mobile device's GPS data when the application is in use, to determine pick-up location. The mobile device's GPS data can continue to be monitored en route and at the destination location. When the passenger exits the vehicle, mobile device GPS location can be tracked to ensure that it diverges from the GPS location of the vehicle. If the mobile device GPS location does not diverge from the vehicle location after passenger drop-off, it can be determined that the mobile device was left inside the vehicle. Additionally, device accelerometer data can be monitored and compared to vehicle accelerometer data to detect differences (or the absence of differences if the device is in the vehicle).

In a third example, in-car imaging devices can be used to identify mobile devices in the vehicle. In particular, cameras in the vehicle can be used in conjunction with image recognition technology and heuristics such as the common form factor of a mobile device (e.g., rectangular, ~5-6"× ~2.5", black screen, etc.) and common places mobile devices are located (e.g., in a person's hand, in a person's pocket, or lying on the seat). Using these technologies, mobile devices that are within a camera's field of view can be identified with high accuracy. When a passenger exits a vehicle, the in-car camera can perform a sweep of the cabin to ensure that a mobile device has not visibly been left behind. If a device is identified in a vehicle, this method detects the forgotten device almost immediately, since the mobile device is tracked during the ride. In some examples, a passenger drop-off determination is satisfied by detecting that a passenger has exited the vehicle (e.g., via interior and/or exterior sensors).

In a fourth example, Near Field Communication (NFC) sensors can be used to detect a mobile device. In general, NFC sensors are short range sensors and typically only detect devices within about a two inch range. In some examples, NFC sensors are strategically located within a vehicle, such as next to in-car phone chargers or other places where passengers are likely to leave their phones during a trip. NFC sensors can give a strong signal as to whether a device has been left in a vehicle. In particular, device sensing by an NFC sensor indicates that a device is in the vehicle.

In a fifth example, Bluetooth signals can also be used to detect a mobile device in a vehicle. In particular, Bluetooth only connects within a certain radius. Thus, if a passenger's mobile device connects to vehicle media via a Bluetooth signal, and the connection is maintained after the passenger exits the vehicle (and the distance between the passenger and the vehicle exceeds the Bluetooth signal radius), it can be determined that the mobile device has been left in the vehicle.

Similarly, in a sixth example, a mobile device can connect to in-vehicle WiFi. The WiFi signal only connects within a certain radius. Thus, if a passenger's mobile device is coupled to vehicle WiFi, and the connection is maintained after the passenger exits the vehicle (and the distance between the passenger and the vehicle exceeds the WiFi signal radius), it can be determined that the mobile device has been left in the vehicle.

In a seventh example, seat weight sensors can detect a mobile device left on a vehicle seat. After a passenger exits the vehicle, a seat weight sensor can detect the weight of items left on the seat. Another sensor may be used to identify the sensed weight as a mobile device versus some other item.

Figure 3:
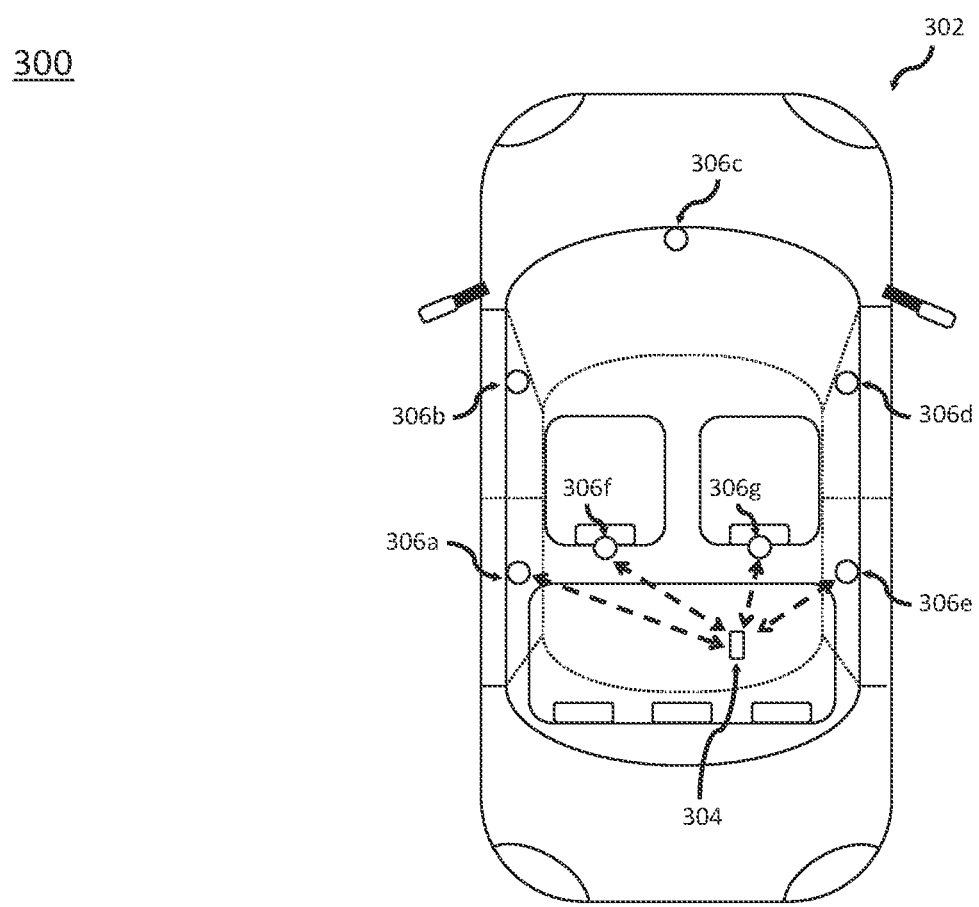
FIG. 3 is a diagram illustrating a method for mobile device detection and recovery, according to some embodiments of the disclosure.

According to various implementations, one or more of the examples above can be used to establish a connection with the device during the ride. FIG. 3 is a diagram 300 illustrating a top view of an interior of an autonomous vehicle 302, according to some embodiments of the disclosure. As shown in FIG. 3, a mobile device 304 is on the back seat of the vehicle 302. There are multiple sensors 306a, 306b, 306c, 306d, 306e, 306f, 306g located throughout the vehicle, and in various implementations, one or more of the sensors 306a-306g can be different from other ones of the sensors 306a-306g. As shown in FIG. 3, the mobile device 304 is coupled to a first sensor 306a, a second sensor 306e, a third sensor 306f, and a fourth sensor 306g. In one example, the first sensor 306a is a microphone that detects a high frequency sound from the device 304, the second sensor 306e is a camera that detects the device 304, and the fourth sensor 306e is a Bluetooth link that the device 304 is coupled to. In various examples, there is one or more passengers in the vehicle 302, while in other examples, the one or more passengers have exited the vehicle 302.

At step 208, at the destination drop-off location, a prevention routine is implemented. The prevention routine is designed to prevent passengers from leaving their mobile devices in the vehicle. In some examples, a pre-drop-off audio message is played reminding passengers to make sure they have all their belongings. In some examples, a pre-drop-off visual message is displayed on screens in the vehicle reminding passengers to make sure they have all their belongings. In some examples, a message is displayed on a passenger's phone reminding them to take their belongings. In some examples, an audio message is played from the passenger's phone reminding them to take their belongings. In one example, the message includes a reminder for the passenger to check for their phone. In some examples, a passenger is asked to swipe their device past a sensor upon exiting the vehicle. In other examples, a notification is sent to the passenger's device, asking the passenger to confirm that drop-off location, or otherwise engaging the passenger with their device.

When the vehicle reaches the drop-off location, the connection can continue to be maintained for a selected period of time after the passenger exits the vehicle. For example, a rideshare application on the device may cause the device to attempt to continue the connection for ten seconds, twenty seconds, thirty seconds, or a minute. In this manner, if the device is still in the vehicle after the passenger exits, the connection will remain strong, indicating the device remains in the vehicle. However, if the device exits the vehicle with the passenger, as the distance between the device and the vehicle increases, the connection will be broken, despite the continued attempt to continue it.

At step 210, it is determined whether a mobile device was left in the vehicle after a passenger exited the vehicle. If no mobile device is detected as having been left in the vehicle, the method 200 ends. In some examples, at step 210, a push-notification is sent to the passenger's mobile device notifying the passenger that the device was left in the vehicle. The notification allows the passenger to verify that the passenger has their mobile device, such that if the mobile device is incorrectly detected as being left in the vehicle, the passenger can indicate they have possession of the device, and the method 200 ends.

Figure 4A:
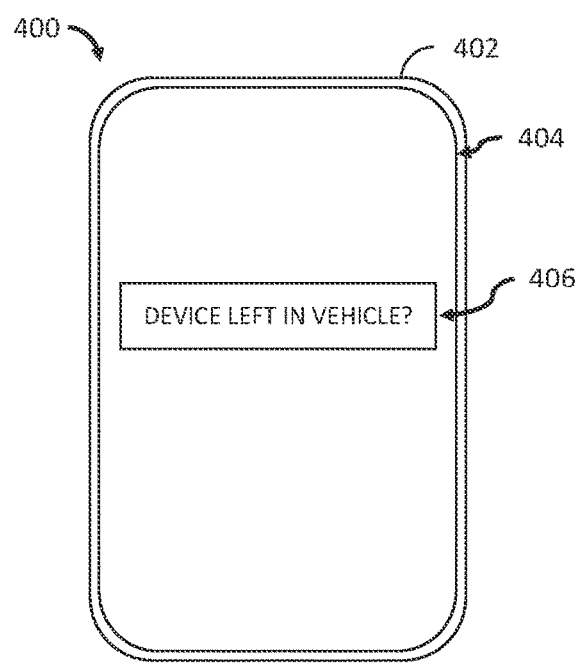
FIGS. 4A and 4B show examples of a device notification, according to some embodiments of the disclosure.
Figure 4B:
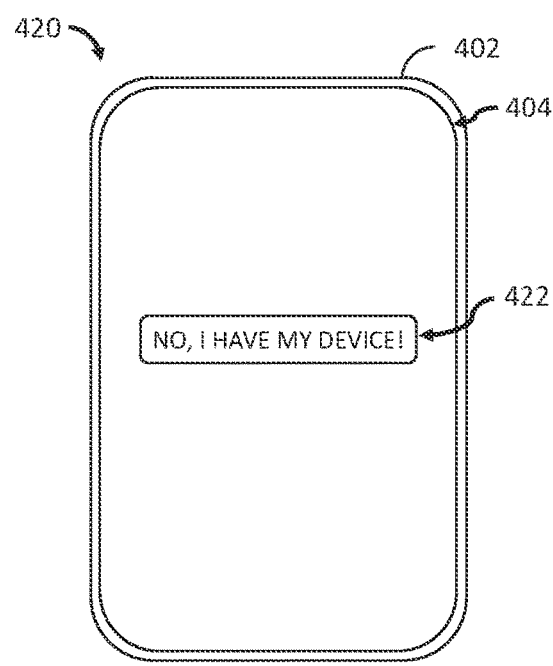

FIGS. 4A and 4B show examples 400, 420 of a device notification, according to some embodiments of the disclosure. In particular, FIG. 4A shows an example 400 of a device 402 showing a push notification 406. The push notification 406 can be displayed on a lock screen, a home screen, or in a rideshare application. If the user has their device, the push notification 406 alerts the user that the rideshare application has determined the device may have been left in the vehicle. FIG. 4B shows an example 420 of the device 402, in which a button 422 is displayed for the user to dismiss the lost device notification. The button 422 allows the user to dismiss the lost phone notification. In various implementations, a code or password is entered to dismiss the notification. For example, a phone lock code or rideshare application password may be entered. In this manner, if the device is found or picked up by a different passenger, the different passenger cannot dismiss the notification or end the lost phone protocol.

If, at step 210, it is determined that the device was left in the vehicle, at step 212, a passenger notification protocol is initiated. The passenger can be notified of the found device in several different ways. In some examples, the passenger rideshare account includes an email address, and a notice is sent to the email address. In some examples, the passenger rideshare account includes one or more designated recovery contacts and an email and/or text message is sent to the one or more designated recovery contacts. In some examples, an audio message is sent to the one or more designated recovery contacts. In some examples, the user's rideshare account can be accessed via a web browser, and a notification is sent to the user's rideshare account. In some examples, the vehicle coupled with devices of one or more fellow passengers traveling with the passenger whose device was left in the vehicle, and the one or more fellow passengers are notified.

Example Method for Mobile Device Recovery

Figure 5:
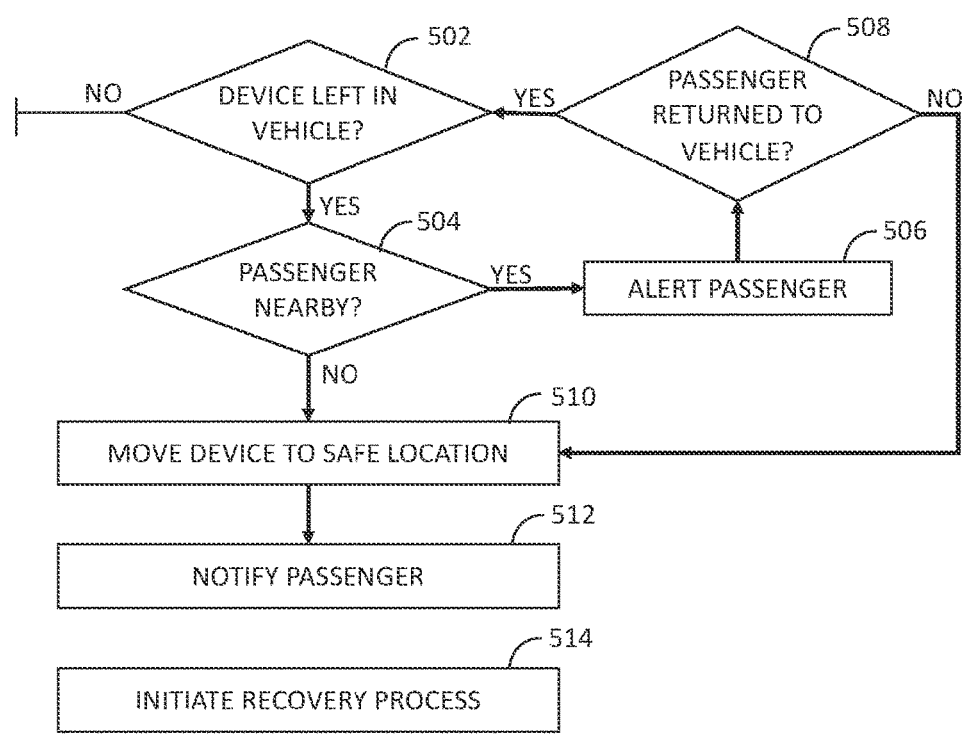
FIG. 5 is a diagram illustrating a method for mobile device recovery, according to various embodiments of the disclosure.

FIG. 5 is a diagram illustrating a method 500 for mobile device recovery, according to various embodiments of the disclosure. At step 502, if a mobile device is detected as having been left in the vehicle, at step 504 it is determined if the passenger is nearby—close to the vehicle. In some examples, this is based on the amount of time since the passenger exited the vehicle (where a very short amount of time indicates the passenger is still close). In some examples, it is based on sensor suite data, such as camera or video images, indicating the passenger is close. In some examples, it is based on the connection with the device. In some examples, it is based on GPS data. If the passenger is still close to the vehicle at step 504, then, at step 506 the passenger is alerted. Alerting the passenger can include emitting a loud sound such as a honk or an audio announcement to the surrounding area and displaying a "lost phone" message on one or more exterior (outward-facing) displays.

Figure 6:
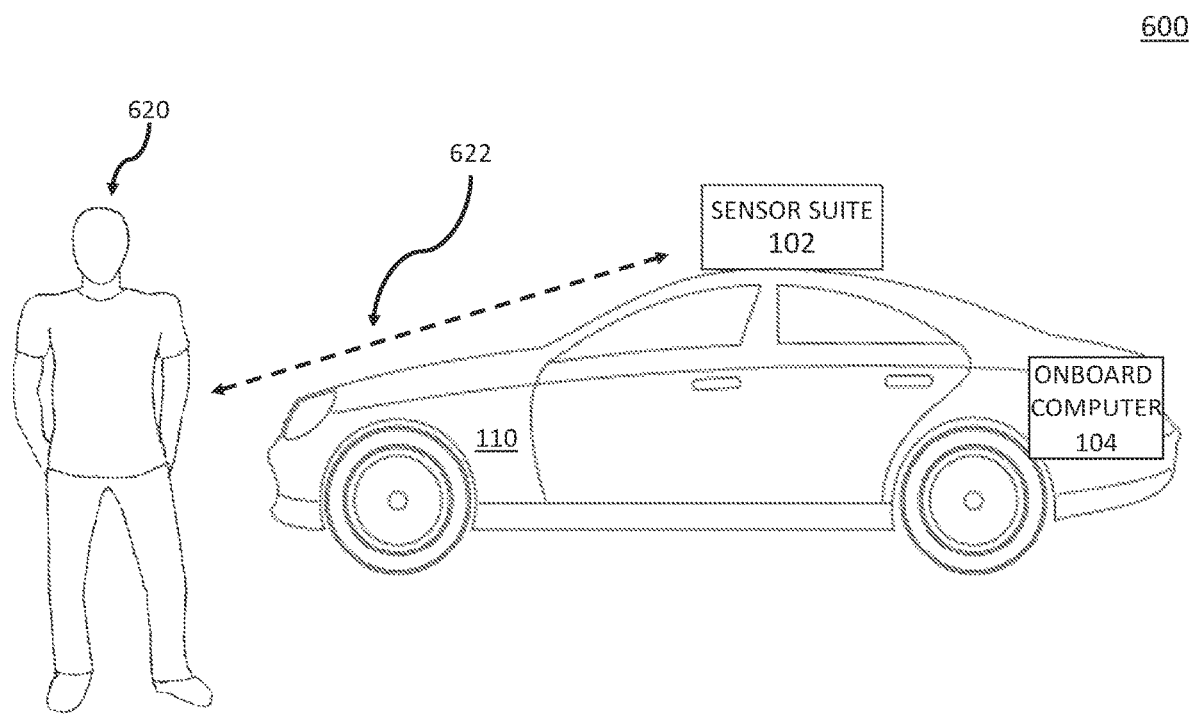
FIG. 6 is a diagram illustrating an autonomous vehicle and a passenger, according to various embodiments of the disclosure.

FIG. 6 is a diagram 600 showing an autonomous vehicle 110 and a passenger 620, according to various embodiments of the disclosure. The passenger 620 is a distance 622 from the autonomous vehicle 110 sensor suite 102. In various examples, at a given distance 622, the sensor suite 102 can detect the passenger 620, and an announcement or other sound emitted from the vehicle is audible to the passenger 620, but the passenger is far enough from the vehicle that the device should be disconnected from established connections. If the device is still coupled, it can be determined that the device is likely still in the vehicle 110.

At step 508, it is determined whether the passenger returned to the vehicle to retrieve the mobile device. If the passenger returned to the vehicle, the method 500 returns to step 502, where it can confirm there is no device remaining in the vehicle, or, if there is, proceed to step 504.

If, at step 504, the passenger is no longer nearby when the forgotten mobile device is detected, the method proceeds to step 510. Similarly, if at step 508, the passenger does not return to the vehicle, the method proceeds to step 510. In some examples, step 512 occurs at the same time as step 510. At step 510, the mobile device is moved to a safe location.

There are several options for moving the mobile device to a safe location. In some implementations, an app or in-car message can request the next passenger to place the forgotten device into a secure box. The passenger can be offered an incentive to cooperate in securing the forgotten device, such as ride credits. In some examples, the vehicle returns to the closest garage or depot where a service person can manually remove the device for safe-keeping. In some implementations, a robotic device within the vehicle retrieves the forgotten device. For example, a simple robotic device can automatically push any items on the vehicle's seats into a retractable tray on the floor of the car. The retractable tray extends out from under the seats to catch any items pushed on the seats, and then retracts back underneath the vehicle seats. In other examples, a robotic arm within the vehicle picks up the device and places it in a safe box for storage.

In addition to keeping the mobile device safe at step 510, at step 512, the method 500 includes notifying the passenger of the found device and initiating a recovery process. The passenger can be notified of the found device in several different ways. In some examples, the passenger rideshare account includes an email address, and a notice is sent to the email address. In some examples, the passenger rideshare account includes one or more designated recovery contacts and an email and/or text message is sent to the one or more designated recovery contacts. In some examples, an audio message is sent to the one or more designated recovery contacts. In some examples, the user's rideshare account can be accessed via a web browser, and a notification is sent to the user's rideshare account.

At step 514, a device recovery process is initiated. The device recovery process is the process of returning the device to the owner. In some examples, a user can set up device return details through an online portal. For example, the user can designate where the device is to be returned to, and within what timeframe the device is to be returned. In various examples, the user can be charged a fee for device return, with the fee depending on the level of service provided. For example, a user can elect to pay a rush fee and to have the device returned immediately, and the vehicle can deliver the device directly to the user. In some examples, a user may choose to pay a lesser amount to have the device returned within a longer timeframe. In some examples, for long distance trips, i.e. trips that are longer than a selected distance, a dispatch algorithm can match the vehicle with ride requests that bring the vehicle nearer to the return address. This allows the rideshare service to continue to operate without reducing vehicle utilization, and can reduce a return fee charged to the user. In some examples, for short distance trips (e.g., less than about five minutes or less than about 2 miles), the vehicle can be dispatched directly to the return address to maximize the probability of safe return and enhance user experience.

In various examples, when the vehicle with the forgotten mobile device arrives at the return address, the user can input a recovery code to verify user identity and retrieve the device. The recovery code can be sent to the user via the user rideshare account, via the user's email address, and/or to via designated user recovery contacts. In some examples, the recovery code allows the user to open the vehicle door. In other examples, the recovery code allows the user to access a lock box containing the device. In some implementations, instead of a recovery code, facial recognition and/or voice recognition is used to verify the identity of the user.

In some implementations, the device is stored at a lost-and-found location, and the user can elect to travel to the lost-and-found location and retrieve the device. In other examples, a device stored at a lost-and-found location can be placed in a vehicle for delivery to a specified address.

In some scenarios, the passenger who loses a mobile device is a guest of the passenger who ordered the ride. Thus, the missing mobile device may not have an associated rideshare account. Without a rideshare account, the device may not be coupled directly to the vehicle using many of the examples listed with respect to FIG. 2. In some examples, a non-rideshare account user may still connect to WiFi or Bluetooth. However, in some examples, when the device belongs to a guest of the passenger and/or rideshare account user, there are fewer methods for detecting the device and for determining the device owner. In some examples, it is determined which passenger/rideshare account user the guest entered the vehicle with, and that passenger is alerted regarding the forgotten device.

In some examples, in a rideshare use case, a first passenger shares the vehicle with other passengers whom the first passenger does not know. If the first passenger leaves a device in the vehicle, it is possible that one of the other passengers can retrieve the device. Systems can be used to track which other device the lost device leaves the vehicle with to determine who retrieved it. In some examples, cameras in the vehicle can be used to identify the person who retrieved the lost device. In some examples, other passengers can be alerted that the vehicle has detected a lost device and is tracking the lost device. The other passengers can be asked to place the lost device in a specific location.

Additionally, in a shared ride, the vehicle tracks devices of each respective rideshare application user in the vehicle. In particular, the vehicle tracks which device belongs with which passenger. In some examples, facial recognition can be used to identify passengers as they enter the vehicle. Additionally, a specific high frequency sound can be played from each passenger's device, where each passenger's device plays a different high frequency sound. The selected frequency that enters with a specific passenger can be used to associate the specific passenger with the selected frequency. Similarly, in a data connection, the IP address of the device that connects when a passenger enters the vehicle can be used to associate the specific passenger with the IP address of the device.

Example of Autonomous Vehicle Fleet

Figure 7:
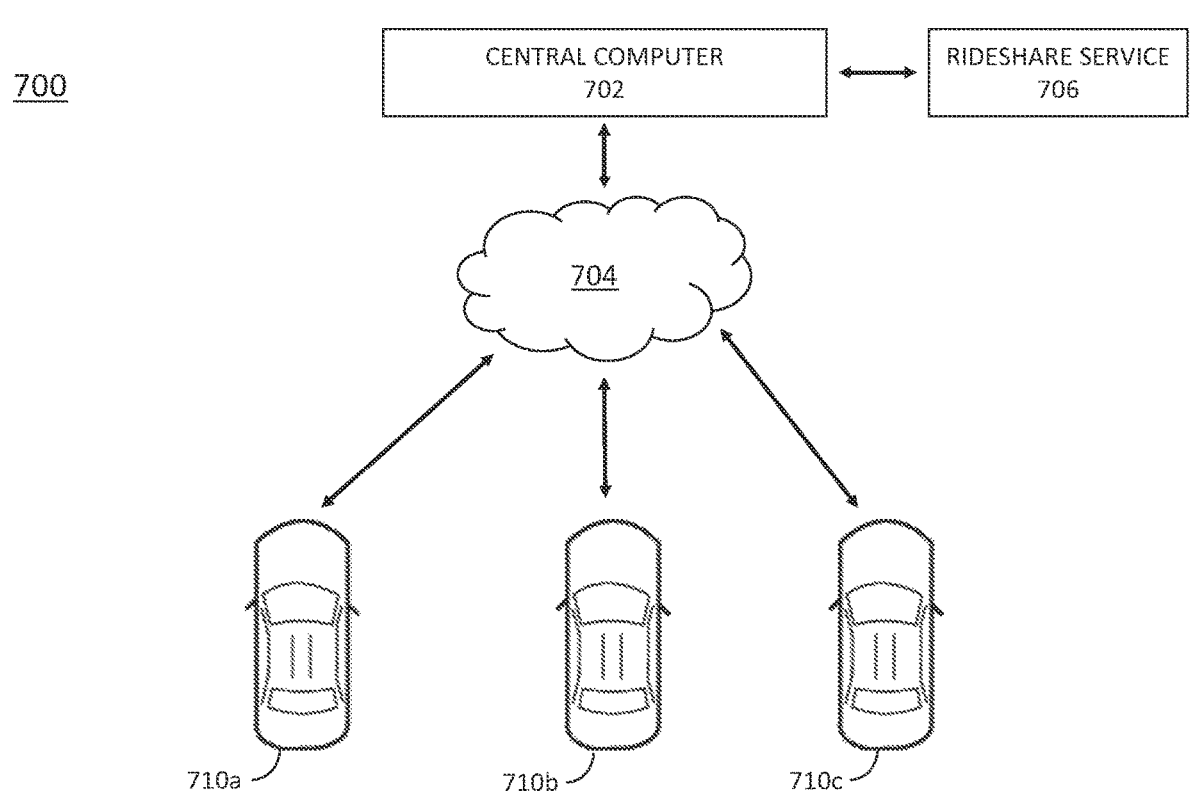
FIG. 7 is a diagram illustrating a fleet of autonomous vehicles in communication with a central computer, according to some embodiments of the disclosure.

FIG. 7 is a diagram 700 illustrating a fleet of autonomous vehicles 710a, 710b, 710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-

710c in the fleet. Autonomous vehicle fleet routing refers to the routing of multiple vehicles in a fleet. The central computer also acts as a centralized ride management system and communicates with rideshare users via a rideshare service 706. The vehicles 710a-710c can each be used to implement the device detection and recovery methods of FIGS. 2 and 5. In some implementations, the autonomous vehicles 710a-710c communicate directly with each other.

When a passenger requests a ride through a rideshare service 706, the rideshare service 706 sends the request to central computer 702. The central computer 702 selects a vehicle 710a-710c based on the request. When the vehicle 710a-701c picks up the passenger, the passenger device is detected and a connection is established with the passenger device, as described above with respect to the methods of FIGS. 2 and 5. The vehicle 710a-710c continues to monitor the device. However, if the device is left in the vehicle 710a-710c after the passenger exits the vehicle 710a-710c, the vehicle 710a-710c contacts the central computer 702 to begin the device recovery protocol. The vehicles 710a, 710b, 710c communicate with a central computer 702 via a cloud 704.

Once a destination is selected and the user has ordered a vehicle, the routing coordinator can optimize the routes to avoid traffic as well as vehicle occupancy. In some examples, an additional passenger can be picked up en route to the destination, and the additional passenger can have a different destination. In various implementations, since the routing coordinator has information on the routes for all the vehicles in the fleet, the routing coordinator can adjust vehicle routes to reduce congestion and increase vehicle occupancy.

As described above, each vehicle 710a-710c in the fleet of vehicles communicates with a routing coordinator. Thus, information gathered by various autonomous vehicles 710a-710c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, the routing coordinator uses collected position data corresponding to emergency events to generate a best route for an autonomous vehicle to avoid a potential emergency situation.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a destination.

Example of a Computing System for Ride Requests

Figure 8:
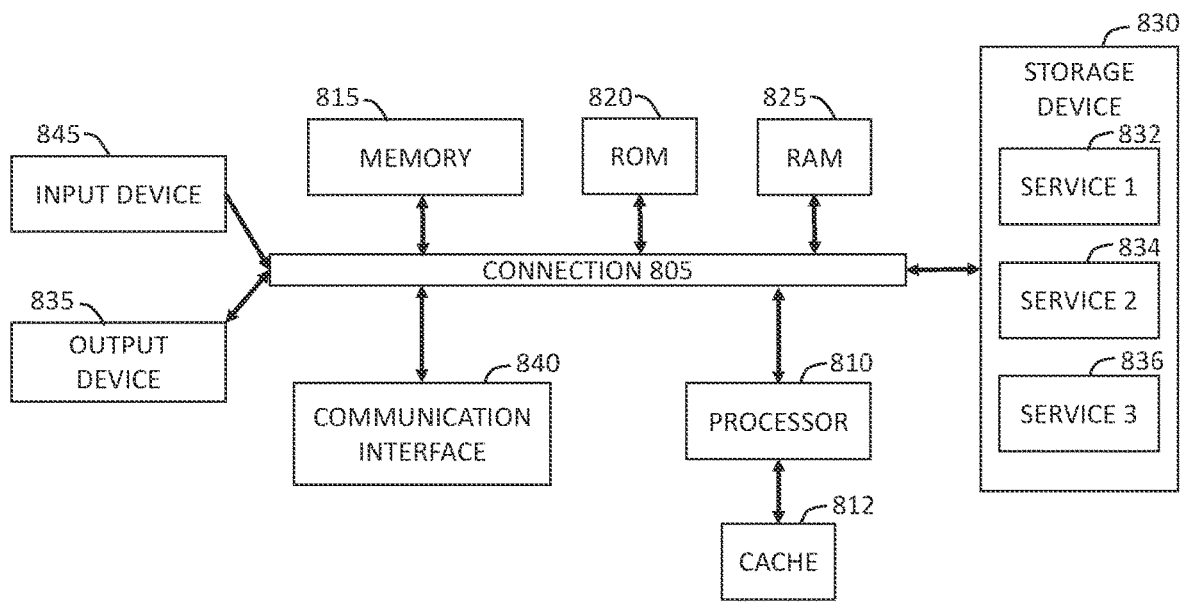
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for detecting a device left in a vehicle, comprising establishing a connection with the device in the vehicle, at a passenger drop-off location, performing a prevention routine, after passenger drop-off, determining whether the connection with the device is maintained, and based on the determination, initiating a passenger notification protocol.

Example 2 provides a method according to one or more of the preceding and/or following examples, further comprising emitting a selected high frequency sound from the device via a device rideshare application, and wherein establishing a connection with the device comprises detecting the selected high frequency.

Example 3 provides a method according to one or more of the preceding and/or following examples, wherein determining whether the connection with the device is maintained further comprises determining whether the selected high frequency is detectable.

Example 4 provides a method according to one or more of the preceding and/or following examples, wherein establishing the connection comprises establishing a wireless data connection between the device and the vehicle.

Example 5 provides a method according to one or more of the preceding and/or following examples, wherein establishing a connection includes detecting the device via at least one imaging device and further comprising tracking the device location via the at least one imaging device.

Example 6 provides a method according to one or more of the preceding and/or following examples, further comprising tracking a device location via a device rideshare application and, after passenger drop-off, determining whether the device location diverges from a vehicle location.

Example 7 provides a method according to one or more of the preceding and/or following examples, further comprising, after passenger drop-off, determining that the device is in the vehicle, and storing the device in a storage compartment in the vehicle.

Example 8 provides a method according to one or more of the preceding and/or following examples, further comprising allowing access to the storage compartment based on at least one of entry of a recovery code, facial recognition, and voice recognition.

Example 9 provides a system for detecting a device in a vehicle, comprising a sensor suite on the vehicle configured to determine when a passenger enters and exits the vehicle, a plurality of sensors inside the vehicle, wherein at least one of the sensors is configured to detect the device and establish a connection with the device; and an onboard computer configured to determine whether the connection with the device is maintained after the passenger exits the vehicle, and, based on the determination, configured to initiate a passenger notification protocol.

Example 10 provides a system according to one or more of the preceding and/or following examples, wherein the at least one of the sensors is configured to detect a selected high frequency sound emitted from the device.

Example 11 provides a system according to one or more of the preceding and/or following examples, wherein the onboard computer is further configured to determine whether the selected high frequency is detectable in the vehicle after the passenger exits the vehicle.

Example 12 provides a system according to one or more of the preceding and/or following examples, wherein the at least one of the sensors is configured to establish a wireless data connection with the device.

Example 13 provides a system according to one or more of the preceding and/or following examples, wherein the at least one of the sensors is an image sensor and wherein the onboard computer is further configured to track the device via the image sensor.

Example 14 provides a system according to one or more of the preceding and/or following examples, further comprising a central computer configured to receive device location data via a rideshare application, wherein, after passenger drop-off, the central computer is configured to determine whether a device location diverges from a vehicle location.

Example 15 provides a system according to one or more of the preceding and/or following examples, further comprising a storage compartment configured to store the device.

Example 16 provides a system according to one or more of the preceding and/or following examples, further comprising a robotic mechanism configured to deposit the device in the storage compartment.

Example 17 provides a system for detecting a device in a vehicle, comprising a plurality of sensors inside the vehicle, wherein at least one of the plurality of sensors is configured to detect the device and establish a connection with the device; an onboard computer in the vehicle configured to determine whether the connection with the device is maintained after passenger drop-off; and a central computing system configured to communicate with the device via a rideshare application and with the onboard computer, wherein the central computing system is configured to transmit data to the device and receive device location data.

Example 18 provides a system according to one or more of the preceding and/or following examples, wherein the data transmitted to the device via the rideshare application includes a selected high frequency and instructions for the rideshare application to emit the selected high frequency sound from the device.

Example 19 provides a system according to one or more of the preceding and/or following examples, wherein the at least one of the plurality of sensors is configured to detect the selected high frequency sound emitted from the device, and wherein the onboard computer is further configured to determine whether the selected high frequency is detectable in the vehicle after passenger drop-off.

Example 20 provides a system according to one or more of the preceding and/or following examples, wherein the central computing system is further configured to determine whether a device location diverges from a vehicle location after passenger drop-off.

Example 21 provides a system according to one or more of the preceding and/or following examples, wherein the onboard computer is further configured to initiate a passenger notification protocol when the device connection is maintained after passenger drop-off, wherein the onboard computer notifies the central computing system of the passenger notification protocol, and wherein the central computing system transmits a first notification to the rideshare application.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for recovery of a device left in a vehicle, comprising:
   determining, by the vehicle, that the device is in the vehicle after passenger drop-off of a first passenger;
   communicating a presence of the device in the vehicle to a first rideshare account of the first passenger;
   accessing recovery contact information from the first rideshare account, wherein the recovery contact information includes at least one of an email and phone number of a second user;
   transmitting a forgotten device notification to the second user, including communicating the presence of the device in the vehicle to the second user;
   receiving, at an online portal, device return details from the second user including a return location and a return timeframe;
   verifying passenger identity at the return location, wherein passenger identity includes at least one of a first identity of the first passenger and a second identity of the second user; and
   providing access to the device to one or both of the first passenger and the second user.

2. The method of claim 1, further comprising transmitting a first device return option and a second device return option to at least one of:
the first account, and
the second user,
and wherein receiving device return details includes receiving a selection including one of the first device return option and the second device return option.

3. The method of claim 1, further comprising moving the device to a selected safe location, wherein the selected safe location is a secure compartment.

4. The method of claim 3, further comprising transmitting, via the online portal, a recovery code to the second user, wherein the recovery code allows access to the secure compartment.

5. The method of claim 4, wherein providing access to the device includes providing access to the secure compartment based on the verified passenger identity, including providing access based on at least one of the recovery code and user recognition.

6. The method of claim 3, wherein moving the device to the selected safe location includes moving the device to a selected lost-and-found center.

7. The method of claim 1, further comprising the vehicle driving to the return location during the return timeframe with the device inside the vehicle, and wherein providing access to the device includes providing access to the vehicle.

8. A system for recovery of a device left in a vehicle, comprising:
a sensor suite on the vehicle to detect passenger pick-up in the vehicle and passenger drop-off from the vehicle;
a plurality of sensors inside the vehicle, wherein at least one of the sensors is to detect the device;
an onboard computer to:
determine that the device is in the vehicle after passenger drop-off of a first passenger,
communicate a presence of the device in the vehicle to a first rideshare account of the first passenger,
verify passenger identity upon device retrieval, wherein passenger identity includes at least one of a first identity of the first passenger and a second identity of a recovery contact in the first rideshare account, and
provide access to the device to one or both of the first passenger and the recovery contact; and
a central computing system to:
access recovery contact information from the first rideshare account, wherein the recovery contact information includes at least one of an email and a phone number of a second user,
transmit a forgotten device notification to the second user, including communicating the presence of the device in the vehicle to the second user;
receive, at an online portal, device return details from the second user including a return location and a return timeframe.

9. The system of claim 8, wherein the central computing system is further to transmit a first device return option and a second device return option to at least one of:
the first rideshare account, and
the recovery contact,
and wherein the device return details include a selection including one of the first device return option and the second device return option.

10. The system of claim 8, further comprising a storage compartment configured to store the device.

11. The system of claim 10, further comprising a robotic mechanism configured to deposit the device in the storage compartment.

12. The system of claim 10, wherein the central computing system is further to transmit, via the online portal, a recovery code to the second user, wherein the recovery code allows access to the storage compartment.

13. A system for recovery of a device in a vehicle, comprising:
a plurality of sensors inside the vehicle, wherein at least one of the plurality of sensors is configured to detect the device;
an onboard computer in the vehicle to:
determine that the device is in the vehicle after passenger drop-off,
communicate a presence of the device in the vehicle to a first rideshare account, and
move the device to a secure location; and
a central computing system to:
receive a notification of the presence of the device in the vehicle,
access recovery contact information from the first rideshare account, wherein the recovery contact information includes at least one of an email and a phone number of a second user,
transmit a forgotten device notification to the second user, including communicating the presence of the device in the vehicle to the second user,
receive, at an online portal, device return details from the second user including a return location and a return timeframe.

14. The system of claim 13, wherein the central computing system is further to
transmit a first device return option and a second device return option to the passenger rideshare account and to the second user,
and wherein the device return details include a selection including one of the first device return option and the second device return option.

15. The system of claim 13, wherein the secure location is a lost-and-found center remote from the vehicle.

16. The system of claim 13, wherein the central computing system is further to:
transmit, via the online portal, a recovery code to the first rideshare account and to the second user, wherein the recovery code allows access to the secure location.

17. The method of claim 1, wherein the second user is a second passenger that travelled in the vehicle with the first passenger.

18. The method of claim 17, wherein the device is a first device, wherein the second passenger has a second device, and wherein the second device was coupled to the vehicle before passenger drop-off.

19. The method of claim 1, wherein transmitting the forgotten device notification to the second user includes transmitting one or more of a text message, an email, and an audio message to the second user.

20. The system of claim 8, wherein the device is a first device, and wherein the onboard computer is further configured to:
couple to a second device of a second passenger before passenger drop-off, wherein the second passenger is the second user, and
transmit the forgotten device notification to the second device after passenger drop-off.

* * * * *